June 7, 1932. E. F. ROSSMAN 1,861,818
SHOCK ABSORBER
Filed July 29, 1929
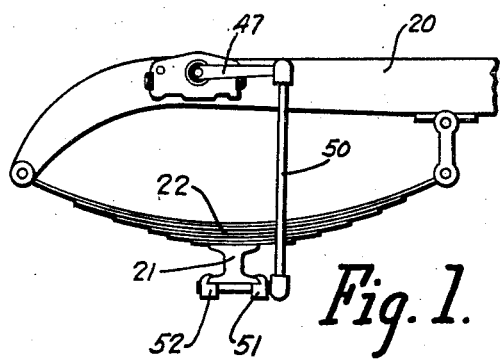
Fig. 1.
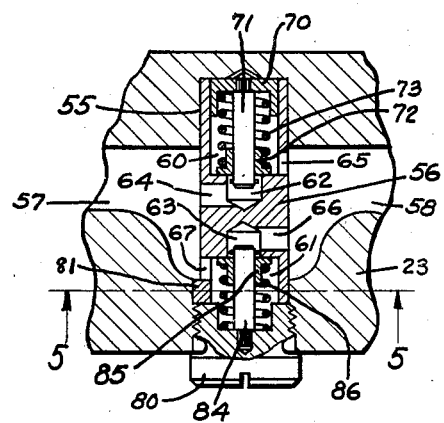
Fig. 4.
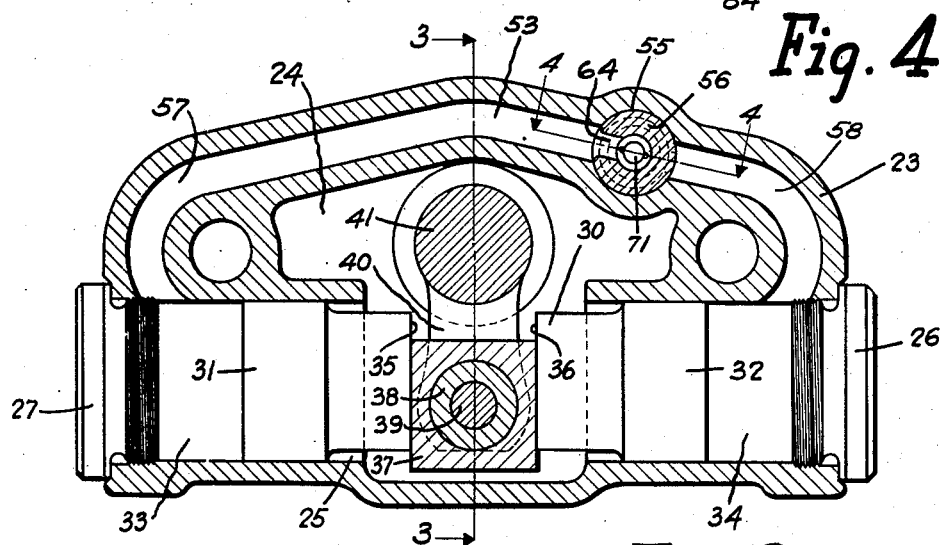
Fig. 2.
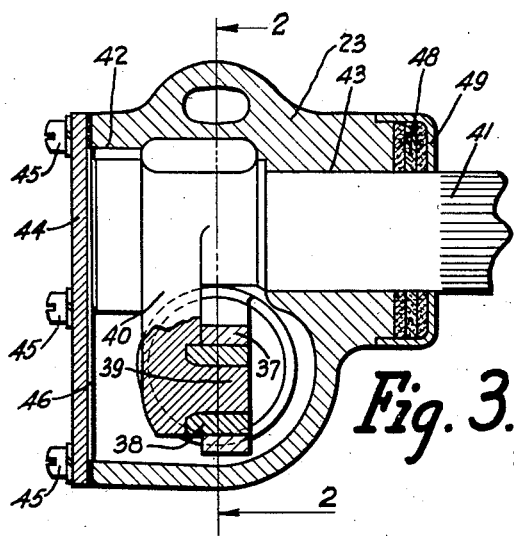
Fig. 3.
Fig. 5.
Inventor
Edwin F. Rossman
By
Spencer, Hardman & Kerr
Attorney Patented June 7, 1932

1,861,818

UNITED STATES PATENT OFFICE

EDWIN F. ROSSMAN, OF DAYTON, OHIO, ASSIGNOR TO DELCO PRODUCTS CORPORATION, OF DAYTON, OHIO, A CORPORATION OF DELAWARE

SHOCK ABSORBER

Application filed July 29, 1929. Serial No. 381,771.

This invention relates to improvements in shock absorbers adapted to control the movements of vehicle springs.

It is among the objects of the present invention to provide a shock absorber of simple structure and design adapted to control both the compression and rebound movements of a vehicle spring.

Another object of the present invention is to provide a shock absorber with pressure relief mechanism comprising a minimum number of parts whereby assembling is facilitated and the cost of commercial production materially reduced.

Further objects and advantages of the present invention will be apparent from the following description, reference being had to the accompanying drawing, wherein a preferred embodiment of one form of the present invention is clearly shown.

In the drawing:

Fig. 1 is a side view of a portion of the vehicle chassis having a shock absorber secured thereto which is equipped with the present invention.

Fig. 2 is a longitudinal sectional view taken through the shock absorber substantially along the line 2—2 of Fig. 3.

Fig. 3 is a transverse sectional view taken along the line 3—3 of Fig. 2.

Fig. 4 is a fragmentary sectional view taken along the line 4—4 of Fig. 2 and illustrating the relief mechanism.

Fig. 5 is a detail sectional view taken along the line 5—5 of Fig. 4.

Referring to the drawing, the numeral 20 designates the frame of the vehicle supported on the vehicle axle 21 by springs 22, only one of which is shown.

The shock absorber comprises a housing 23, providing a fluid reservoir 24 and a cylinder portion 25. The ends of the cylinder portion of the casing are closed by plugs 26 and 27 suitably engaging the casing substantially to prevent fluid leaks.

Within the cylinder portion 25 of the casing there is provided a fluid displacement member 30 comprising oppositely disposed head portions 31 and 32, which form compression chambers 33 and 34 respectively at the ends of the cylinder. The compression chamber 34 may be termed the spring compression control chamber, while the chamber 33 may be termed the spring rebound control chamber. The fluid displacement member has a recess intermediate the head portions 31 and 32 presenting substantially parallel, spaced walls 35 and 36. A block 37 is slidably supported between said spaced walls 35 and 36, said block having a central opening for receiving the bearing 38 which is supported upon a stud 39 provided adjacent the end of the rocker arm 40. The rocker arm 40 has a rocker shaft 41, one end of which is journalled in the bearing 42 provided by the casing, the other end in the bearing 43 also provided by the casing. A cover 44 is secured to the rear side of the casing 23 by screws 45, said cover being provided with a gasket 46 substantially preventing leaks from the casing on the rear side thereof. The portion of the rocker shaft 41 journalled in the bearing 43 extends outside the casing and has the shock absorber operating arm 47 provided thereon. Packing members 48 are provided about the rocker shaft 41 adjacent the bearing portion 43, a packing gland 49 fitting about the casing 23 urging said packing members 48 into sealing engagement with the shaft 41 and the outer surface of the casing 23.

The free end of the shock absorber operating arm 47 is swivelly secured to one end of a connecting link 50, the other end of which is attached to the bracket 51 clamped to the axle 21 by the clamping member 52.

The casing 23 is provided with a duct 53 which connects the compression chambers 33 and 34 as shown in Fig. 2. A recess 55 is provided in the casing transversely of the duct 53.

The recess 55 is adapted to receive the pressure relief mechanism of the shock absorber.

The pressure relief mechanism of the shock absorber comprises a valve cage member 56 which, when inserted into the recess 55 divides the duct 53 into two portions 57 and 58, the former communicating with the compression chamber 33, the latter with the compression chamber 34. The valve cage 56 in the form of a cylindrical plug, has a recess forming a valve chamber at each end thereof, one being designated by the numeral 60, the other by the numeral 61. Recess 60 has a counterbore 62, and recess 61 has a counterbore 63, these counterbores not communicating, however. These counterbores each provide a valve seat in their respective recesses 60 and 61. Counterbore 62 is in communication with the duct portion 57 through a passage 64 provided in the valve cage 56. Another passage 65 provides communication between the duct portion 58 and the valve chamber 60. A passage 66 connects duct portion 58 with the counterbore 63, while the passage 67 provides communication between the valve chamber 61 and the duct portion 57. From this it may be seen that ordinarily duct portions 57 and 58 are in communication through passage 64, counterbore 62, valve chamber 60 and passage 65, or passage 66, counterbore 63, valve chamber 61 and passage 67. Communication between the duct portions 57 and 58 is, however, under the control of pressure release valves, one of which is contained in each valve chamber 60 and 61 respectively.

In the end of the valve cage 56 engaging the inner end of recess 55 there is provided a cover plate 70 carrying a valve pin 71 so that said valve pin extends coaxially through the valve chamber 60 and into its counterbore 62. Upon this valve pin 71, valve 72 is slidably supported. A spring 73 surrounds the pin 71 and is interposed between the cover plate 70 and the valve 72, and normally urges the valve 72 into engagement with its valve seat so that said valve will cut off communication between the passages 64 and 65, the passage 64 leading to the pressure side of valve 72, the passage 65 leading from the valve chamber 60 on the relief side of valve 72.

A screw plug 80 is threadedly inserted into the outer end of the recess 55 in casing 23, the inner end of said screw plug engaging the outer end of the valve cage 56 normally to hold it in proper position in the recess 55. Staking of the valve cage 56 adjacent its outer end provides a hump 81 which is adapted to enter a keyway 82 in the casing so that the valve cage 56 is properly located within the recess 55. Screw plug 80 supports a valve pin 84 extending substantially coaxially through the valve chamber 61 into its counterbore 63. A valve 85 is slidably supported on said valve stem, being yieldably urged into engagement with the valve seat in the chamber 61 by the spring 86 surrounding pin 84 and interposed between the valve and the screw plug. Valve 85 normally shuts off communication between the passage 66 communicating with duct portion 58 and the passage 67 communicating with duct portion 57.

The operation of the shock absorber is as follows: When the vehicle wheels, not shown, strike an obstruction in the roadway, the vehicle springs 22 will be compressed or flexed toward the frame 20, this movement resulting in a movement of the link 50 to operate the shock absorber operating arm 47 in a counterclockwise direction. Counterclockwise movement of the arm results in a similar movement of the rocker arm 40, said rocker arm thus moving the fluid displacement member 30 toward the right as regards Fig. 2. Fluid within the compression chamber 34 will have pressure exerted thereon which, when attaining a proper value, will be exerted through duct portion 58 upon the valve 85. When said pressure is sufficient it will move the valve 85 from its seat against the effect of the spring 86, thus communication will be established between the duct portions 58 and 57 and consequently fluid from the compression chamber 34 will be transferred through the duct portion 58, passage 66, counterbore 63, past the valve 85 into the valve chamber 61 and out of passage 67, through duct portion 57 into the opposite chamber 33, the cubical contents of which is being increased by the movement of the fluid displacement member 30 toward the right, as has been mentioned. The fluid flow past valve 85 is properly restricted, thus the movement of the fluid displacement member 30 in response to the compression movement of springs 22 will be resisted.

The tendency of the vehicle springs after having reached the limit of flexure caused by the particular obstruction met, will be to return to normal, unflexed position with a sudden, rebounding movement which, if permitted, will result in undesirable jars and jolts being transmitted to the frame 20 of the vehicle. The present device controls this sudden return action of the springs 22. As soon as said springs start to return to normal position, the connecting link 50 will move the operating arm 47 clockwise, resulting in a clockwise rotation of the rocker shaft 41 and its rocker lever 40. The fluid displacement member 30 is now moved toward the left as regards Fig. 2, and consequently fluid within the compression chamber 33 will have pressure exerted thereon, said pressure being transmitted through duct portion 57 against the valve 72. As soon as the pressure in duct portion 57 has attained a proper value, it will move the valve 72 from its seat against the effect of spring 73, thus fluid may flow from the duct portion 57 through passage 64, counterbore 62, past valve 72 into the valve chamber 60 and thence through passage 65, duct portion 58 into the opposite compression chamber 34. This flow of fluid is restricted by the valve 72 so that the movement of the fluid displacement member 30 will be comparatively resisted and thus the return movement of the springs 22 toward normal position will be likewise controlled.

The present device provides a shock absorber with a single duct connecting the compression chambers, said duct including a pressure relief mechanism having two pressure relief valves cooperating with a single valve cage member.

In order to change the characteristics of the shock absorber so that it may be used with various types of vehicles, plug 80 may be removed, which permits removal of the valve cage 56. To obtain a stiffer ride, springs 72 and 86 may be replaced by springs of greater tension, while a more resilient ride may be had by substituting springs of lesser tension. The relief mechanism is easily assembled and disassembled as are the other parts of the shock absorber, thus facilitating manufacture and maintaining the cost of commercial production at a substantial minimum.

While the form of embodiment of the present invention as herein disclosed, constitutes a preferred form, it is to be understood that other forms might be adopted, all coming within the scope of the claims which follow.

What is claimed is as follows:

1. A shock absorber comprising in combination, a casing presenting a cylinder portion; a piston in said cylinder forming two compression chambers therein; a single duct providing communication between said chambers; a recess in the casing transversely of the duct; a plug insertable into said recess to divide the duct into two portions, said plug providing two valve chambers; and a pressure release valve in each of said valve chambers, one valve being adapted to establish a flow of fluid through the duct in one direction only, the other in the other direction only, in response to proper fluid pressures in said duct.

2. A shock absorber comprising in combination, a casing presenting a cylinder portion; a piston in said cylinder forming two compression chambers therein; a single duct providing communication between said chambers; a recess in the casing transversely of the duct; a plunger in said recess dividing the duct into two portions, said plunger having a recess in each end thereof providing a pressure and relief chamber at each of said ends of said member; a separate spring loaded valve in each relief chamber, shutting off communication between the respective pressure and relief chambers; means for closing the ends of the recesses in said member; passages in said member connecting one duct portion with one pressure chamber and the relief chamber at the opposite end of said member; and a duct connecting the other pressure chamber with the relief chamber at the other end of said member.

3. A shock absorber comprising in combination, a casing presenting a cylinder portion; a piston in said cylinder forming two compression chambers therein; a single duct providing communication between said chambers; a recess in the casing transversely of the duct; a plug in the recess, having a valve chamber at each end; transverse passages in said plug connecting each duct portion with the respective valve chambers; a spring-loaded valve in each valve chamber, normally cutting off communication between the duct portions connected therewith; and means for maintaining said plug in properly alined position with the duct portions said means supporting one of said valves in proper cooperative position relative to said plug.

4. A shock absorber comprising in combination, a casing presenting a cylinder portion; a piston in said cylinder forming two compression chambers therein; a single duct providing communication between said chambers; a recess in the casing transversely of the duct; a valve cage member in said recess dividing the duct into two portions; a cavity in each end of the valve cage member each cavity having a counterbore which forms valve seats in the respective cavities; transverse passages connecting each counterbore with a respective duct portion; transverse passages connecting the respective cavities with the duct portion connected with the counterbore of the other cavity; and spring-loaded valves yieldably maintained upon the valve seats in the cavities for controlling the flow of fluid from one duct portion to the other, in either direction.

5. A shock absorber comprising in combination, a casing presenting a cylinder portion; a piston in said cylinder forming two compression chambers therein; a single duct providing communication between said chambers; a recess in the casing transversely of the duct; a valve cage insertable into said recess for dividing the duct into two portions, and providing two valve chambers; passages in the valve cage connecting the respective valve chambers with the two duct portions; a cover for one of the valve cage recesses; a pin carried by the plate substantially coaxially of the respective recess; a valve slidably supported on said pin; a spring interposed between the plate and valve, normally urging the valve to shut off communication between the two passages connecting said valve cage recess with the two duct portions; a key-way in the outer surface of the valve cage adapted to aline with the aforementioned key-way when the valve cage is properly positioned within the recess of the casing; a key fitting into said alined key-ways for properly locating the valve cage and preventing rotation thereof; a screw-plug adapted to be received in the outer end of the recess in the casing and engaging the end of the valve cage to hold it in proper position within the recess of the casing; a pin carried by the screw-plug; a valve slidably supported on the pin; and a spring normally urging said valve to shut off communication between the passages connecting the respective valve chamber with the duct portions.

6. A shock absorber comprising in combination, a casing presenting a cylinder portion; a piston in said cylinder forming two compression chambers therein; a single duct providing communication between said chambers; a recess in the casing transversely of the duct; a pressure controlled valve mechanism insertable into said recess, having provisions for establishing a flow of fluid through the duct in one direction only, said valve mechanism providing a valve cage for a second valve; a plug insertable into the outer end of the recess for holding the valve mechanism in proper position and for sealing said recess against fluid leaks; and a valve carried by the plug, said valve being adapted to cooperate with the valve cage mentioned, for establishing a flow of fluid through the duct in a direction opposite to the flow established by the first mentioned valve mechanism.

In testimony whereof I hereto affix my signature.

EDWIN F. ROSSMAN.